United States Patent [19]

Judd

[11] Patent Number: 4,945,656

[45] Date of Patent: Aug. 7, 1990

[54] CIRCULATING FLUIDISED BED APPARATUS

[75] Inventor: Michael R. Judd, Westville, South Africa

[73] Assignee: National Energy Council, South Africa

[21] Appl. No.: 387,236

[22] Filed: Jul. 31, 1989

[30] Foreign Application Priority Data

Aug. 12, 1988 [ZA] South Africa .................... 88/5986

[51] Int. Cl.$^5$ .......................................... F26B 17/00
[52] U.S. Cl. ................................... 34/57 A; 34/57 B; 34/10; 432/58
[58] Field of Search ................... 34/57 A, 57 B, 10; 432/15, 58; 110/245, 347; 122/4 D; 431/7; 165/104.16; 422/139

[56] References Cited

U.S. PATENT DOCUMENTS

| | | | |
|---|---|---|---|
| 3,571,946 | 3/1971 | Karweil | 34/57 A |
| 4,035,152 | 7/1977 | Yang et al. | 34/57 A |
| 4,338,887 | 7/1982 | Leon | 122/4 D |
| 4,404,755 | 9/1983 | Stewart et al. | 34/57 A |
| 4,628,831 | 12/1986 | Delessard et al. | 34/57 A |
| 4,772,193 | 9/1988 | Glatt | 34/10 |
| 4,879,958 | 11/1989 | Allen et al. | 34/57 A |

FOREIGN PATENT DOCUMENTS

86/3804 5/1985 South Africa .
1142542 2/1969 United Kingdom .
2165464 10/1985 United Kingdom .

OTHER PUBLICATIONS

Solids Circulation Between Adjacent Fluidized Beds Without Gas Mixing, Chong et al., 5/67.
Integrated Gasification Combined Cycle Process According to MBG Technology, 6/1988.
MBG-An Allothermal Process for Pressurized Coal Gasification 3/80.

Primary Examiner—Henry A. Bennet
Assistant Examiner—Denise L. Ferensic
Attorney, Agent, or Firm—Hayes, Soloway, Hennessey & Hage

[57] ABSTRACT

The invention provides a circulating fluidized bed apparatus comprising a housing and a pair of spaced partitions located within the interior of the housing. The partitions are spaced from each other to define a draught zone therebetween having a lower inlet and an upper outlet. Separate fluid feed arrangements are provided for feeding separate fluidizing fluids into the housing for fluidizing particulate material in the draught zone and for fluidizing particulate material outside the draught zone. Above the draught zone the housing has a fluid outlet arrangement for fluidizing fluid from the draught zone, and a fluid outlet arrangement for fluidizing fluid from the housing outside the draught zone.

11 Claims, 4 Drawing Sheets

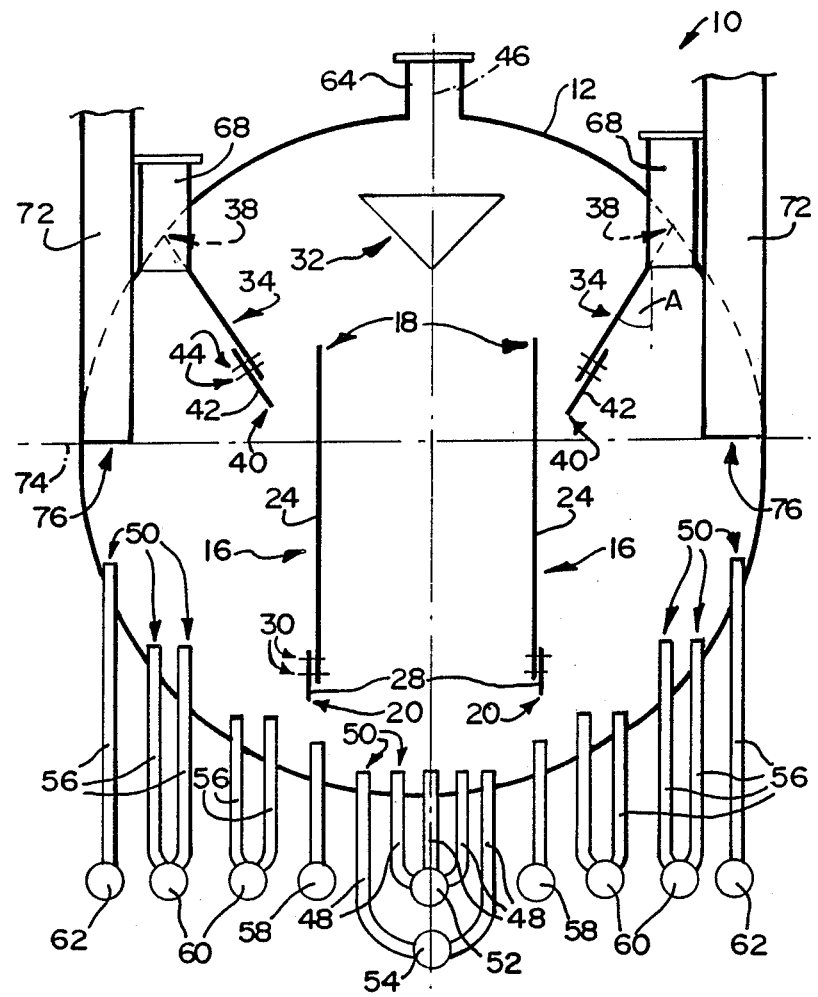
FIG 2
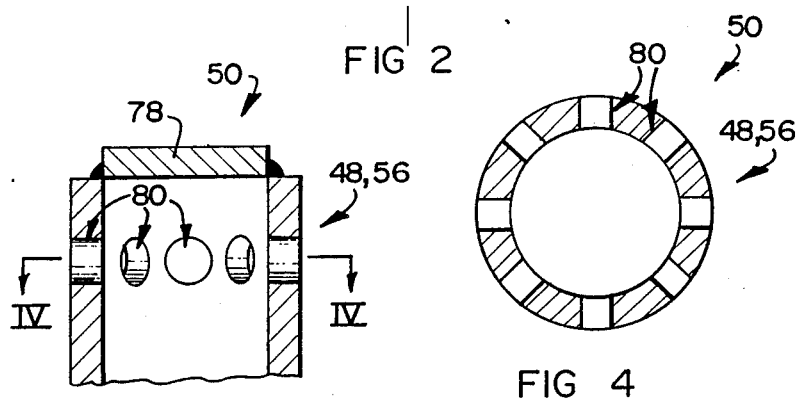
FIG 3
FIG 4

CIRCULATING FLUIDISED BED APPARATUS

This invention relates to a circulating fluidised bed apparatus. More particularly it relates to a circulating fluidised bed apparatus suitable for the gasification of a carbonaceous feedstock such as coal.

According to the invention there is provided a circulating fluidized bed apparatus comprising:

a housing;

a pair of spaced partitions located within the interior of the housing, the partitions being opposed to each other and horizontally spaced from each other to define a draught zone therebetween, the partitions each extending upwardly from lower edges defining therebetween a lower inlet leading into said zone from the interior of the housing outside said zone, to upper edges defining therebetween an upper outlet leading form said zone into the interior of the housing outside said zone;

separate fluid feed arrangements respectively for feeding a fluidizing fluid into the housing for fluidizing a particulate material in the draught zone between the partitions and for feeding a fluidizing fluid into the housing for fluidizing a particulate material in the interior of the housing outside said draught zone, the feed arrangement for said draught zone being a central feed arrangement located under the draught zone and the feed arrangement for the interior of the housing outside said draught zone being an outer feed arrangement located on opposite sides of the central feed arrangement and below the interior of the housing outside the draught zone; and above the draught zone, fluid outlet arrangements from the housing respectively for fluidizing fluid from the draught zone and fluidizing fluid from the interior of the housing outside said draught zone, namely a central fluid outlet arrangement for fluidizing fluid from the draught zone and an outer fluid outlet arrangement for fluidizing fluid from the interior of the housing outside the draught zone, the outer fluid outlet arrangement being located on opposite sides of the central fluid outlet arrangement.

In the apparatus defined above, when the interior of the housing outside the zone and the zone are charged with a suitable inventory of particulate material, fluidizing fluids can be fed simultaneously respectively into the draught zone and into the interior of the housing outside the zone at respective rates and pressures such that the particulate material both inside the draught zone and in the interior of the housing outside the draught zone is fluidized, and such that there is a nett upward flow of particulate material upwardly in the draught zone, out of the top of the draught zone into the interior of the housing outside the draught zone, downwardly in said interior on opposite sides of the draught zone, and inwardly into the draught zone at the bottom of the draught zone, fluidizing fluid for the particulate material in the draught zone being fed into the housing via the central feed arrangement and issuing from the housing from the central outlet arrangement and fluidizing fluid for the particulate material in the interior of the housing outside the draught zone being fed into the housing via the outer feed arrangement and issuing from the housing via the outer outlet arrangement, so that a circulating fluidised bed is obtained in the apparatus.

It is accordingly possible to employ two substantially different fluidizing fluids respectively for fluidizing particulate material in the draught zone and for fluidizing particulate material in the interior of the housing outside the draught zone; and the rates and pressures at which these fluids are fed to and issue from the housing, the solids inventory of particulate material in the housing, and the geometry of the apparatus can be selected such that substantially all the fluidizing fluid fed via the central feed arrangement passes upwardly through the draught tube and substantially all the fluidizing fluid fed via the outer feed arrangement passes upwardly through the interior of the housing outside the draught tube.

It is thus possible to cause two substantially different processes to take place simultaneously, respectively in the draught zone and in the interior of the housing, outside the draught zone; and by suitable selection of the abovementioned operating and apparatus parameters to ensure that substantially all the fluid leaving the particulate material in the draught zone issues from the housing via the central outlet arrangement and substantially all the fluid leaving the particulate material in the interior of the housing outside the zone issues from the housing via the outer outlet arrangement.

When the particulate solids inventory is a carbonaceous feedstock such as powdered coal of a suitable particle size, coal discards, duff coal, fly ash, wood particles, or the like, and the fluidizing fluids are respectively steam and an oxygen-containing gas such as air, the apparatus can be used for the gasification of carbon to produce a combustible gas such as fuel gas or synthesis gas, a combustion process taking place in the draught zone and a gasification process taking place in the interior of the housing outside the zone, or vice versa.

The partitions may be in the form of a pair of panels each extending upwardly from a lower edge to an upper edge, the lower edges of the panels being at the same level as each other and spaced above the housing so that the space between the lower edges of the panels and the housing provides the lower inlet into the draught zone, and the upper edges of the panels being at the same level as each other and spaced below the housing so that the space between the upper edges of the panels and the housing provides the upper outlet from the draught zone. The panels may each have horizontal lower and upper edges which are straight, the panels typically being flat and vertically aligned with each other so their surfaces are parallel to each other and vertical.

The partitions may extend horizontally alongside each other in direction transverse to the horizontal direction in which they are spaced from each other, the housing having an outline in vertical section along a vertical plane parallel to the direction in which the partitions are spaced from each other, which outline is bilaterally symmetrical about a vertical plane parallel to the partitions and located midway therebetween.

The partitions will be suitably supported in the housing, e.g. by additional supports if their connections to the end walls cannot bear their mass. The partitions may be of a heat resistant or refractory material, e.g. stainless steel, or a suitable ceramic or composite material capable of withstanding temperatures of up to 1000° C. or more; or they may be hollow and water cooled being e.g. similar to water walls in steam boilers, in which case they can be used for steam generation.

The housing may have a pair of horizontally spaced end walls, the partitions having end edges fast with the end walls, and said outline in vertical section of the housing being circular, so that the housing is in the form of a hollow cylindrical vessel having a horizontal axis.

Thus, the end walls may be circular in outline, being e.g. outwardly dished and part spherical in the fashion of pressure vessel end walls.

The central feed arrangement may comprise a central array of stand pipes projecting upwardly into the interior of the housing and terminating at upper ends provided with fluid distribution nozzles and spaced below the inlet to the draught zone, the outer feed arrangement comprising a pair of outer arrays of stand pipes on opposite sides of the central array, the stand pipes of the outer arrays projecting upwardly into the interior of the housing and terminating at upper ends provided with fluid distribution nozzles.

The stand pipes of each array may be arranged in rows, the stand pipes of each row being spaced in series from one another and the rows extending from one end of the housing to the other, the apparatus including a plurality of pressurizable plenum chambers extending alongside one another in a direction from one end of the housing to the other, the lower ends of the stand pipes of each row communicating with the same plenum chamber, the upper ends of all the pipes communicating with each plenum chamber being at the same elevation in the housing, and the upper ends of the laterally outermost stand pipes being at the highest elevation with the upper ends of the laterally innermost stand pipes being at the lowest elevation and said elevations increasing progressively from the innermost stand pipes to the outermost stand pipes. The upper end of each stand pipe may be closed off, its fluid distribution nozzle comprising a horizontal row of peripherally spaced passages through its side wall adjacent the closed end of the pipe, the outer end of each passage being at an elevation no higher than the inner end thereof, to resist ingress of solids inventory into the stand pipes in use. Typically the stand pipes will be circular and the passages will be equally circumferentially spaced horizontal radial passages.

The plenum chambers, while they may be inside the housing, are preferably outside and below the housing. The plenum chambers may be in the form of compartments separated by partitions, or they may be in the form of pipe manifolds, spaced from one another, from which the stand pipes project. Having the upper ends of all the stand pipes from each plenum chamber at the same elevation ensures that there is substantially the same flow through each nozzle in use, promoting even fluid distribution in the housing. It is also desirable for each plenum chamber to be of a sufficiently great cross-section to avoid any significant pressure changes along its length in use; and it is desirable that the nozzles be designed so that, in operation there is a pressure drop across each nozzle from its stand pipe into the bed, which is at least 40% of the pressure drop through the bed from the nozzle to the top of the bed.

While the above stand pipe arrangement is preferred for the feed arrangements, the feed arrangements could also in principle be in the form of perforated plates forming the upper walls or roofs of plenum chambers located inside the housing, namely a central lowermost plate under the draught zone and, on opposite sides of the central plate, one or more outer perforated plates at elevations increasing progressively from the central plate laterally outwardly. All the perforated plates should however be horizontal so that the progressive increase in elevation is stepwise.

The top of the draught zone may be enclosed by a hood having a pair of downwardly depending skirts which have lower edges outwardly spaced respectively from the partitions and located below the level of the upper edges of the partitions. The skirts of the hood may slope upwardly from their lower edges and oppositely outwardly.

When the housing has end walls, as described above, the hood may be provided by a pair of flat baffles extending between the end walls and projecting downwardly from the housing to lower edges which provide the lower edge of said skirt. The baffles may in other words accordingly slope downwardly and laterally inwardly, so that they converge downwardly towards each other and towards the partitions. The baffles may be adjustable in depth, so that the level of their lower edges and the spacing between said lower edges and the partitions can be adjusted. Similarly the panels which constitute the partitions may be adjustable in depth, so that the levels of their upper and/or lower edges can be adjusted. The baffles are preferably equally spaced on opposite sides of the draught zone.

The central fluid outlet arrangement may comprise a plurality of outlet openings through the housing spaced in series from one another at a central position above the draught zone, the outer fluid outlet arrangement comprising two series of outlet openings through the housing above the interior of the housing on opposite sides of the draught zone. Thus, in other words, the central fluid outlet arrangement may lead from the hood upwardly through the housing, at a central position and at a level above the upper edges of the partitions, the openings of the central fluid outlet arrangement extending in a central row from one end of the wall of the housing to the other. The outer fluid outlet arrangement similarly comprising two rows of said outlet openings, will be respectively outwardly of the baffles, these two series extending along and outwardly adjacent the junctions between the respective baffles and the housing.

A deflector, which may be V-shaped in cross-section, may be provided above the outlet of the draught zone, extending parallel to the partitions along the housing, between said outlet and the central fluid outlet arrangement, the deflector acting to reduce unwanted losses of coarse solids inventory material from the housing via said central fluid outlet arrangement.

The apparatus may have a particulate solids feed system, comprising a plurality of downwardly extending ducts into the interior of the housing, the ducts having outlets into the interior of the housing outside the draught zone. This particulate solids feed system may be suitable for feeding a consumable particulate solid such as carbonaceous material to be gasified, continuously or typically intermittently into the housing. The feed system may comprise a plurality of downwardly extending, e.g. vertical, ducts into the interior of the housing outside the draught zone, the ducts preferably having horizontal lower outlet openings into the housing. Two rows of ducts may be provided, e.g. extending along the housing with the ducts spaced as far as possible laterally and horizontally from the partitions. Each duct may have pair of spaced valves such as slide valves or lock-hoppers therein, providing an air lock therebetween, this feature being possible as the valves can be located remote from high temperature zones in the housing.

In use, the fluid feed inlet of the central compartment and the fluid feed inlets of the chambers of the outer compartments will typically be connected to sources of fluidizing fluid under pressure, the outlet openings of the fluid outlet arrangements being connected to manifolds or headers for receiving fluids issuing from the housing, and the solids feed ducts being connected to a supply of particulate solids.

As indicated above, it is expected that a practical use for the apparatus of the present invention will be in the gasification of coal or a similar carbonaceous feedstock, typically with a combustion process taking place in the draught zone and a gasification process taking place in the interior of the housing outside and on opposite sides of the draught zone. In such a process the two main combustion reactions are:

$$C + O_2 \rightarrow CO_2 \quad [1]$$

$$2C + O_2 \rightarrow 2CO \quad [2]$$

and the two main gasification reactions are:

$$C + H_2O \rightarrow CO + H_2 \quad [3]$$

$$C + 2H_2O \rightarrow CO_2 + 2H_2 \quad [4]$$

For this type of process, experiments conducted by the Applicant indicate that the spacing between the separators should be such that the upward flow of air in the draught zone necessary for the combustion process provides an upward gas velocity in the draught zone of about 4-5 times the minimum fluidizing velocity required to fluidize the particulate material in the draught zone; while the upward flow of steam in the housing on opposite sides to the draught zone necessary for the gasification reaction should be no more than sufficient reliably to fluidize the particulate material outside the draught zone, i.e. its upward velocity should be above but as close as possible, with an adequate safety margin, to the minimum fluidizing velocity required to fluidize the particulate material. The amounts of fluid flowing should however also be selected to promote adequate autothermicity of operation of the apparatus at the operating temperature[s] of the apparatus, so that no separate heat input is required other than the combustion in the draught zone. Routine experimentation, coupled with the use of standard heat and mass balances, empirical coal analyses and standard thermodynamic data, can be employed to determine adequate or optimum parameters, taking also economic considerations into account. The rates and extent at which reactions [1]-[4] above take place in the apparatus should also be borne in mind.

Similar considerations apply to the vertical depth of the partitions. It is believed in this regard that the gasification reactions, which are slower than the combustion reactions, will be controlling. The exact spacings respectively between the upper and lower edges and the wall of the housing above and below the partitions is determined by routine experimentation to be such as to promote smooth flow through the circulating bed of fluidized particles.

When the apparatus of the present invention is used for coal gasification, it is contemplated that the solids inventory of the housing will comprise a major proportion of inert refractory sand having a suitable particle size distribution, said solids inventory comprising about 5-15%, e.g. 10% by mass of carbonaceous feedstock such as coal fines. The refractory sand acts as an allothermic agent in that it transports heat throughout the housing during circulation of the fluidized bed. The sand causes the coal to be dispersed and thus reduces agglomeration of the particulate carbonaceous material and promotes retention of fines of the carbonaceous material or of its ash in the housing, particularly in the housing outside the draught zone.

As the sand transports heat in the housing, the rate at which it circulates up through the draught zone and down outside the draught zone has an important bearing on the rate at which carbonaceous material can be processed, by both combustion in the draught zone and by gasification outside the draught zone, the higher the circulation rate the higher, within limits, the rate at which these processes can take place.

It is contemplated that, in steady state operation during coal gasification, coal will be fed to the apparatus at a constant rate, fines produced by coal gasification and combustion, i.e. mainly fly ash, leaving the apparatus in the synthesis gas as produced by the gasification process, and in the relatively low calorific value waste gas from the combustion process. Tests carried out by the Applicant indicate that up to twice as much fines can leave in the waste gas as leave in the synthesis gas, which is an advantage as the latter is the more valuable product and cleaning thereof of fines represents an expense.

During steady state operation there will be some build up of larger particles in the inventory, typically of ash but also possibly of foreign matter. These large particles should be removed from time to time, e.g. making use of a fluo-solids outlet valve from a low part of the housing, taking care to ensure that operation of this valve or similar solids removal device does not cause unacceptable pressure fluctuations in the circulating bed, which can adversely affect control of the process.

Any refractory sand lost as fines or in oversize removal from the housing will be replenished from time to time via the solids feed system, the said addition being of sand graded to have a particle size distribution which keeps the particle size distribution of the solids inventory in the housing within acceptable limits for proper operation of the process. If desired, oversize particles and sand removed from the housing can be separated and the sand can be recycled to the housing.

The fluidizing fluids [air and steam] will typically be preheated, e.g. by heat exchange with combustion waste gases and/or synthesis gas, for promoting process thermal efficiency. For measurement of bed inventory levels, the apparatus may include probes into the circulating bed for measurement of pressure differences between different levels in the housing. These probes can be steeply inclined or vertically downwardly projecting pipes which need not be purged. Instead, the usual purged ports into the housing can be used for pressure measurements.

It should also be noted with regard to operation of the apparatus that instability can arise whereby solids and/or fluids flow velocities and/or pressures outside the draught zone on one side of the draught zone does not match and are not the same as those on the opposite side of the draught zone.

The Applicant proposes to counteract any such imbalance by appropriately adjusting the pressure of the fluidizing fluid [steam] in the plenum chambers or manifolds of the outer fluid feed arrangements to ensure that solids inventory flow downwardly on each side of the housing outside the draught zone remains at least approximately the same.

The invention will now be described, by way of example, with reference to the accompanying diagrammatic drawings in which:

FIG. 2 shows a schematic sectional end elevation of the apparatus of FIG. 1;

FIG. 3 shows, in sectional side elevation and on an enlarged scale, a detail of the upper end of one of the stand pipes of the apparatus of FIGS. 1 and 2;

FIG. 4 shows a sectional plan view of the stand pipe of FIG. 3 in the direction of line IV—IV in FIG. 3;

Figure 1:
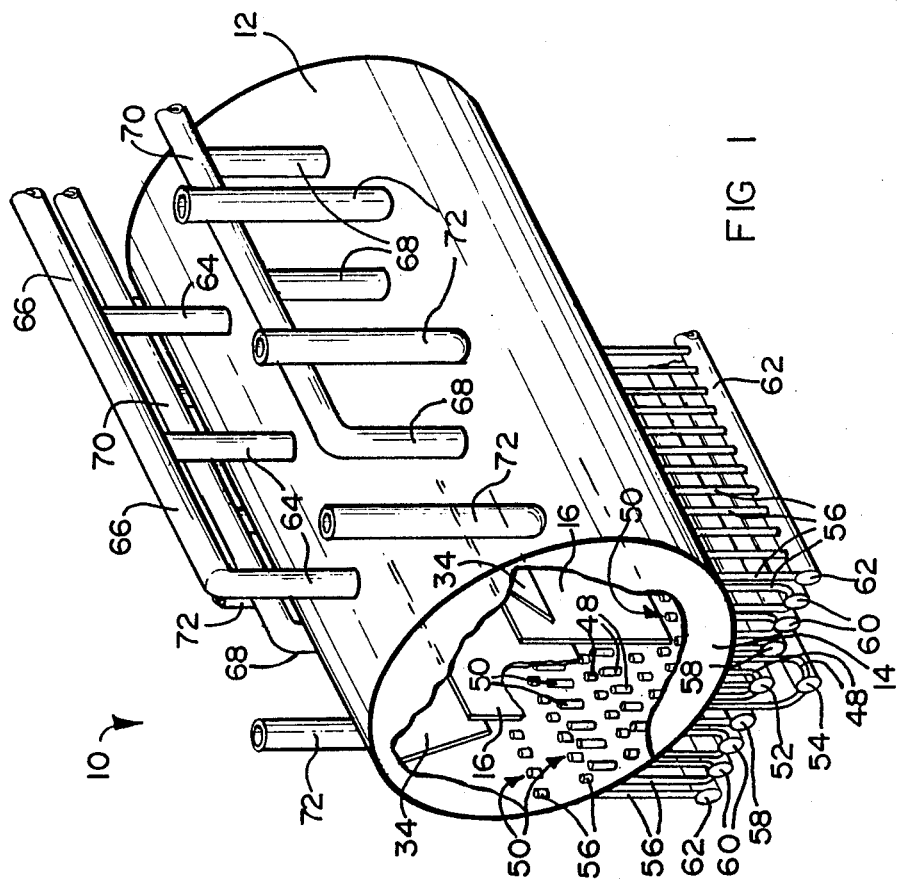
FIG. 1 shows a schematic three dimensional view of a circulating fluidized bed apparatus in accordance with the invention, with parts of its housing broken away for ease of illustration.
Figure 8:
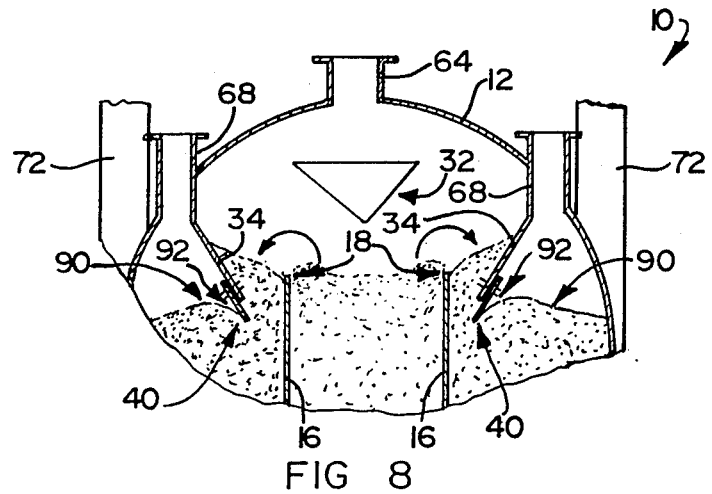
FIG. 8 shows a partial view corresponding to FIG. 2, illustrating the particulate solids adjacent the upper edges of the partitions and the lower edges of the baffles of the apparatus of FIGS. 1 and 2, in use.

In FIGS. 1, 2 and 8 of the drawings, reference numeral 10 generally designates a circulating fluidized bed apparatus in accordance with the invention, suitable for the gasification of powdered coal. The apparatus has a housing 12 in the form of a horizontally extending hollow cylinder of circular cross-sectional outline, and having outwardly dished part spherical end walls 14 of circular outline.

A pair of opposed registering partitions in the form of horizontally spaced flat vertical heat resistant stainless steel panels 16 are provided in the housing 12. Each panel 16 has a horizontal upper edge 18 spaced below the curved wall of the housing 12, a horizontal lower edge 20 spaced above the curved wall of the housing 12, and a pair of end edges [not shown] fast with the respective end walls 14. Each panel 16 is elongated in the direction of its edges 18, 20, being of elongate outline.

With particular reference to FIG. 2, the panels are adjustable in depth, each being made up of two portions, namely a fixed portion 24 and an adjustable lower portion 28. The fixed portion 24 has its end edges connected to the end walls 14 of the housing, and the adjustable portion 28 is vertically adjustable relative to the portion 24 by releasable bolts 30 located in vertical slots in one or both of said portions 24, 28. If desired, a further adjustable portion [not shown] may be provided at the upper edge of each fixed portion 24, similarly connected to the portion 24 and vertically adjustable to provide an upper edge 18 which is adjustable in elevation.

A V-shaped deflector 32 (not shown in FIG. 1) is provided, spaced above the upper edges 18 of the panels 16 and below the curved wall of the housing 12. The deflector 32 is elongate, extending between the end walls 14, with which its ends are fast, and having a horizontal width slightly less then the spacing between the panels 16.

A pair of baffles 34, together with the end walls 14, define a hood over the upper edges 18 of the panels 16. The baffles are also elongated, having end edges at opposite ends thereof fast with the end walls 14, upper edges fast at 38 with the curved wall of the housing 12, and lower edges 40 spaced laterally outwardly of and below the respective upper edges 18 of the panels 16. The baffles slope inwardly and downwardly from 38, so that they converge downwardly at an angle A to the vertical, towards the panels 16. The lower edges 40 of the baffles 34 are adjustable in depth being provided on lower portions 42 (not shown in FIG. 1) of the baffles 34, each of which lower portions is fastened to the remainder of the associated baffle 34 by bolts at 44 located in upwardly extending slots in said portions 42 or in the remainder of the baffles 34.

The panels 16 and baffles 34 are equally spaced on opposite sides of the central vertical axis of symmetry of the housing indicated by chain dotted line 46 in FIG. 2.

A central fluid feed arrangement is provided below the zone between the panels 16, extending from one end wall 14 to the other and fast therewith. This fluid feed arrangement comprises an array made up of five rows of stand pipes 48. The stand pipes 48 project upwardly into the interior of the housing 12 and terminate at upper ends 50 provided with fluid distribution nozzles [described hereunder with reference to FIGS. 4 and 5]. The rows of pipes 48 are spaced laterally from one another and each row extends from one end of the housing to the other. This central array of pipes 48 is located under the draught zone defined between the partitions 16 and the pipes 48 lead upwardly from two pressurizable plenum chambers 52 and 54 in the form of pipe manifolds, the chamber 52 feeding into the central three rows of pipes 48 and the chamber 54 feeding into the outermost two rows of pipes 48.

An outer fluid feed arrangement is provided by two outer arrays of stand pipes 56, similarly projecting upwardly into the interior of the housing 12 from pipe manifolds and terminating in upper ends 50 provided with fluid distribution nozzles. The stand pipes 56 of the outer arrays lead upwardly from similar pipe manifolds 58, 60. Each manifold 58 has a single row of pipes 56 projecting upwardly therefrom these rows being respectively under the partitions 16; the manifolds 60, which are arranged in two pairs respectively outwardly adjacent the manifolds 58, each have two rows of pipes 56 leading therefrom into the housing 12 on opposite sides of the draught zone; and the manifolds 62 which are laterally outermost alongside the outer manifolds 60 each have a single row of pipes 56 leading therefrom into the housing.

A central fluid outlet from the housing 12 is provided, comprising a plurality of openings through the curved wall of the housing 12 and leading into pipes 64. The pipes are arranged in a central row extending along the top of the housing 12 and spaced in series in the direction of the axis of the housing. The pipes 64 lead to a common gas header 66. An outer fluid outlet arrangement from the housing is also provided, comprising two rows of openings through the curved wall of the housing 12 and leading into pipes 68. The pipes 68 of each row are spaced in series in the direction of the axis of the housing and the rows of openings leading into them pass respectively through the wall of the housing 12 immediately below the junctions at 38 between the baffles 34 and the housing 12, and into common headers 70.

The housing 12 has a solids feed system comprising vertical ducts 72 leading tangentially downwardly into the housing 14 on opposite sides of the panels 16. The ducts 72 have outlet openings at the horizontal diametrical plane 74 [chain dotted lines in FIG. 2] of the housing 12, and are located immediately adjacent the curved wall of the housing 12. The ducts 72 have outlet openings at their lower ends at 76 whose peripheries are horizontal. Depending on the length of the housing in the direction of its axis, there may be a single duct 72 on each side of the plane 46, or there may be a row of ducts 72 spaced in series in the direction of the axis of the housing 12, on each side of the plane 46. Each duct 72 has a pair of spaced slide valves or lock hoppers [not shown] defining an air lock therebetween, the lower lock hopper or slide valve being sufficiently high up the duct 72 to be protected from excessive temperatures.

Turning to FIGS. 3 and 4, the upper end of a stand pipe 48, is generally designated 50. Said upper end 50 is closed off by a plate 78 and is provided with a fluid distribution nozzle comprising an equally circumferentially spaced horizontal row of horizontal passages 80.

Figure 5:
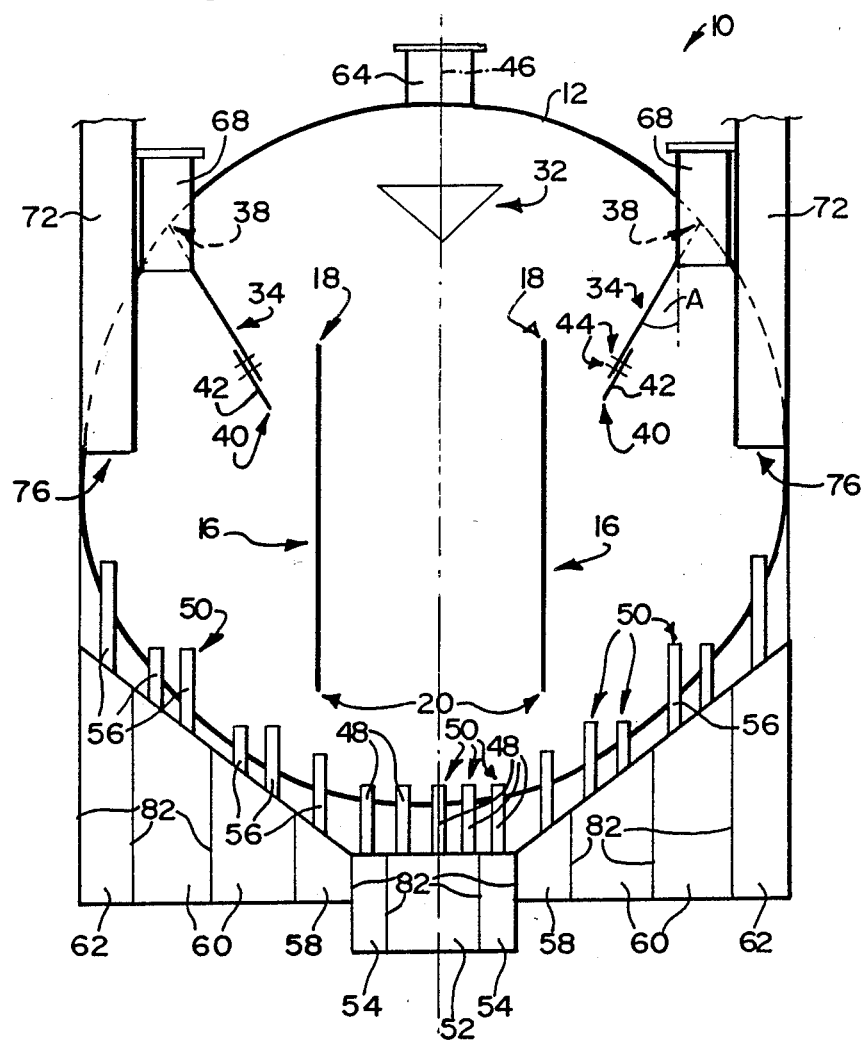
FIG. 5 shows a view corresponding to FIG. 2 of another embodiment of the apparatus of the invention.
Figure 7:
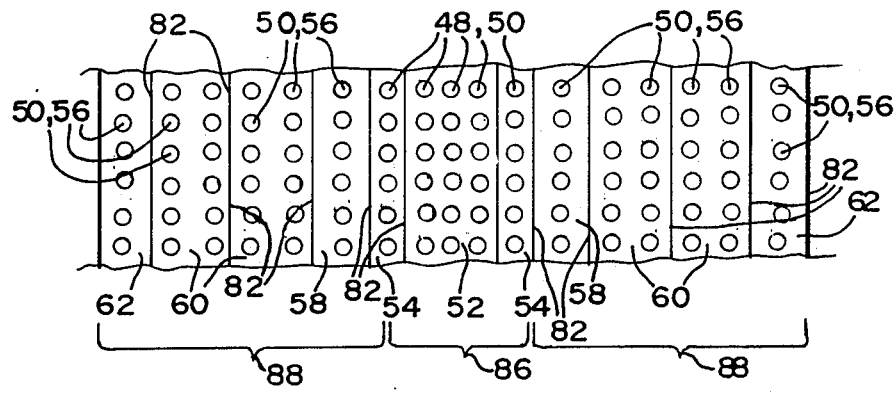
FIG. 7 shows a plan view of the arrays of stand pipes of the apparatus of FIG. 5.
Figure 6:
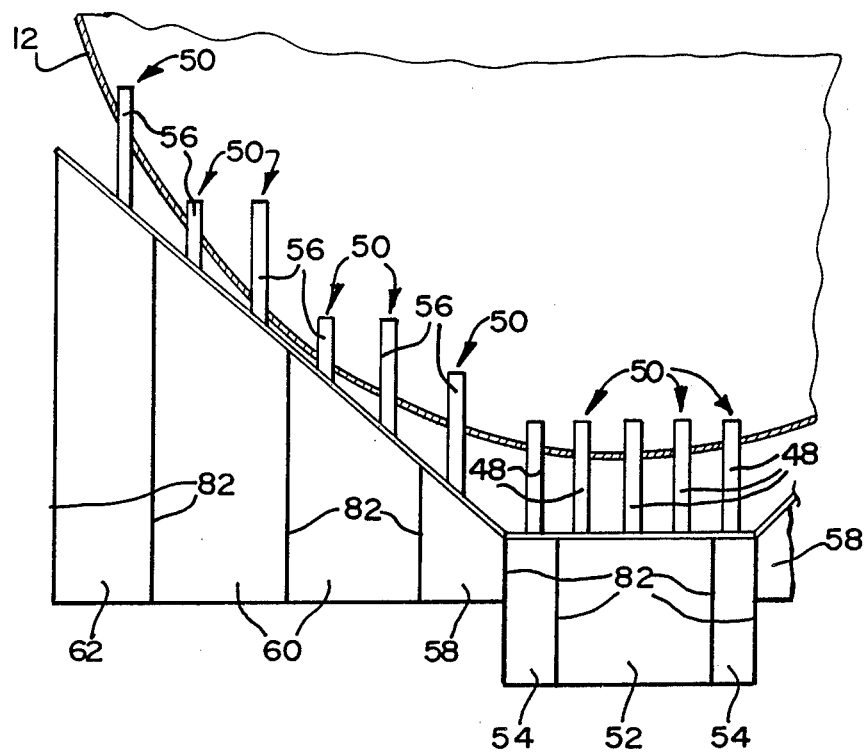
FIG. 6 shows a detail on an enlarged scale of FIG. 5.

In FIGS. 5, 6 and 7 the same reference numerals are used to designate the same parts as in FIGS. 1 and 2, unless otherwise specified. The pipe manifolds 52, 54 and 58–62 of FIG. 1 and 2 are replaced in FIGS. 5–7 by correspondingly numbered pressurizable plenum chambers, separated by walls 82 from one another, there being two plenum chambers 54. In FIG. 7 the central array of pipes 48 is designated 86 and the two other arrays of pipes 56 are designated 88. The partitions 16 are shown without any upper or lower adjustable portions such as the adjustable portion 28 of FIGS. 1 and 2.

In use, for the gasification of powdered coal, the apparatus 10 is operated by charging it with a suitable inventory of refractory sand and powdered coal, the powdered coal making up about 10% by mass of the inventory. Blowing preheated air into the housing 12 via manifold pipes 52, 54 and the pipes 48, blowing steam into the housing 12 via the manifold pipes 58, 60 and 62 and pipes 56, and igniting the coal in the zone between the panels 16, leads to coal gasification and production of synthesis gas.

The Applicant has found that by routine experimentation with regard to the geometry of the apparatus (e.g. The spacing between and elevation of the upper and lower edges of the panels 16; the spacing between the positions 38 where the baffles 34 join the housing 12, the angle A of said baffles 34 to the vertical and their depth; the elevation and spacing of the upper ends 50 of the pipes 48, 56 and the number and size of said pipes and the construction of their nozzles, etc and the operating parameters thereof (e.g. The flow rate and pressure in air manifold pipes or plenum chambers 52,54; the respective flow rates and pressures at which steam is supplied to the various manifold pipes or plenum chambers 60, 62; whether steam or air is supplied to the manifold pipes or plenum chambers 58 and the flow rate and pressure thereof; the pressures in the pipes 64, 68 at the openings where they communicate with the housing; the inventory of refractory sand and coal charged to and maintained in the housing; etc), it is possible to obtain operating conditions whereby the inventory in the draught zone between the partitions 16 is fluidized and the inventory in the interior of the housing outside said zone is also fluidized, while at the same time:

(a) there is nett upflow of inventory in the zone between the partitions 16 which forms the draught zone;
(b) inventory moving upwardly in the draught zone overflows the upper edges 18 of the partitions 16 and falls downwardly between the partitions 16 and lower edges 40 of the baffles 34, into the interior of the housing 12 outside and on opposite sides of the draught zone;
(c) there is a nett downward flow of inventory in the interior of the housing 12 outside the draught zone;
(d) fluidized inventory slides downwardly and inwardly over the bottom of the housing 12 and into the bottom of the draught zone between panels 16 above the stand pipes 48;
(e) substantially all the air from the pipe manifolds or plenum chambers 52, 54 passes up the draught zone between the partitions 16 and substantially no such air passes up the interior of the housing 12 outside the draught zone;
(f) substantially all the steam from the manifolds or plenum chambers 60, 62 passes upwardly up the interior of the housing 12 outside the draught zone and substantially no such steam passes up through the draught zone between the partitions 16;
(g) substantially all of the gas emerging from the top of the draught zone between the partitions 16 issues from the hood between the baffles 34 via the pipes 64 and substantially none of said gas leaves the housing 12 via the pipes 68; and
(h) substantially all of the gas emerging from the top of the inventory in the interior of the housing 12 on opposite sides of the draught zone issues from the housing 12 via the pipes 68 and substantially none of said gas leaves the housing 12 via the pipes 66.

It will be appreciated that during steady state operation of the apparatus 10, autothermic gasification of coal with the steam takes place in a fluidized bed of sand and coal in the interior of the housing 12 outside the draught zone; the air being employed for combustion of coal in the draught zone between the panels 16 to provide the heat required for the gasification. Naturally if desired the situation can be reversed, with combustion air being fed via the plenum chambers 60–62, and steam via the plenum chambers 52–54.

Furthermore, as regards the manifolds or plenum chambers 58, these can be used to adjust pressures at the inlet to the draught zone by feeding air, steam, or no fluid, as required, to promote separate upward flow of air and steam, the one passing between the partitions 16 in the draught zone and the other moving outside the partitions, or vice versa.

In the draught zone between the panels the inventory is caused to flow upwardly, by slug flow and pneumatic elevation.

It is contemplated that the apparatus 10 described with reference to the drawings can be used to provide a low energy combustion gas, or a synthesis quality gas, using duff coal which need not be graded. Size distribution can vary within wide limits without materially affecting gasifier operation, and a small proportion of larger particles up to 25 mm in size can be acceptable. Coal quality is not critical and grades of coal or char containing up to 50% by mass of ash can be used. Clearly, the higher the ash content of the coal, the less favourable will be the heat balance. An important requirement for the ash is that its softening point should be greater than the contemplated maximum reaction temperature of about 950° C., and its softening point should preferably be higher than 1200° C. Drying of coal feed may be necessary but only to ensure satisfactory transport properties. The only other requirements for the process are water, used primarily for steam generation, and air for combustion. Diesel fuel or fuel gas can be used for initial heating and ignition of the process during start-up, and waste heat from combustion and/or synthesis gases can be used via suitable heat exchangers to heat incoming air and steam.

It is contemplated that one version of the process suitable for fuel gas production may take place at marginally above atmospheric pressure, and another version of the process, suitable for power gas production or synthesis gas production, may take place at a more elevated pressure of e.g. 20–45 bars. The housing 12 is typically a steel vessel lined with ceramic insulation and the outer shell of the vessel may be air cooled.

It is contemplated that the particulate fluidized bed material will comprise about 10% by mass of coal and about 90% by mass of inert material, initially refractory sand (used for start-up) but possibly with a substantial proportion of ash after the process has operated for some time. The operating temperature can be in the region of about 800° C. to 1000° C., the lower temperatures being found in the outer gasification region and the higher temperatures in the combustion region. The temperature in the upper part of the gasification region is selected so that substantially no tars are formed during the gasification.

Typically the combustion gas products from the draught zone will comprise essentially carbon monoxide, carbon dioxide and nitrogen, and may have value as a low quality fuel gas. Solid material which passes the deflector 32 and enters the pipes 64 (which is mainly ash), can be separated by cyclones and returned to housing 12. Fines, e.g. less than 100 microns in size which pass the cyclones, can be separated by secondary cyclones, quenched and discarded. The clean combustion gas can then be passed through heat exchangers to recover its sensible heat, e.g. for steam production, and then burned, in for example a waste heat boiler or a combustion gas turbine.

The synthesis or power gas withdrawn separately through pipes 68 is dedusted in a similar fashion, cooled in heat exchangers, and can be wet scrubbed or dry scrubbed in order to remove essentially all the particulate matter. Conventional desulphurizing may be effected thereon, depending on the gas quality required.

Coarse ash removal and bed inventory management can be achieved either by removing a proportion of the bed material from the housing 12 via suitable lock-hoppers, quenching and discarding it, and/or by adding fine refractory sand, depending on the particular characteristics of the coal being gasified. Steam for the process can be obtained, as mentioned above, from a waste heat boiler using waste heat from the combustion gases, and a variable capacity Roots -type blower can be used as a supply means for feeding the combustion air into the process, preferably pre-heated to about 200°–500° C. by waste gas from the process.

Using the apparatus shown has the advantages that elutriation of the fine fuel particles is reduced, and particulate feed material such as coal can be dispersed into comparatively inert bed material containing sand and ash, which reduces the undesirable likelihood of agglomeration of feed coal and sintering thereof at feed points. Tars and oils in carbonaceous feedstocks are cracked and heavy hydrocarbon products are not expected to be observed in either the product synthesis gas stream or the combustion gas waste stream.

A particular feature of the invention is that, with reference to FIG. 7, which shows solids inventory flowing in operation of the apparatus, a standing wave has been observed at 90 on the surface of the fluidized coal under each of the baffles 34, with the lower outer side face of each baffle being essentially particle-free at 92, down to its lower edge 40. This particle-free space provides a low-pressure pathway for gas leaving the top of the inventory bed in the interior of the housing 12 outside the draught zone, to flow through towards the pipes 68. This promotes separation of the gases at the constrictions between the lower edges 40 of the baffles 34 and the panels 16, to resist passages of gas from the interior of the housing 12 outside the draught zone into the hood and vice versa.

A further particular feature of the apparatus, is that it lends itself to easy scaling-up from successful pilot plant design to full scale plant design. If a pilot plant is tested and designed with a housing of full scale diameter but of a short length or spacing between the end walls 14, merely long enough for end wall effects to be negligible, then scaling up is trivially easy. Such scaling up involves merely extending the length of the housing 12, panels 16, baffles 34, plates 48,50, walls 56 and panels 58 in the direction of its axis, the geometry, in particular vertical dimensions, of the apparatus otherwise being kept unchanged and suitable gas, steam and solids feeds being provided, with solids removal devices, at spaced intervals along the length of the housing 12. In contrast, in prior designs known to the Applicant employing a central vertical draught tube in a cylindrical housing whose axis is vertical, scaling up is virtually impossible without a redesign and retesting each time the diameter and/or height of the housing or draught tube are varied, and as radial dimensions become large, material issuing from a central draught tube cannot be spread evenly over the annular area outside the tube, leading to channelling, radial temperature gradients and general inefficiency. The capacity of the apparatus of the present invention is however in principle infinitely variable, without additional testing, merely by varying the length of the apparatus. However, should any axial maldistribution of pressure arise in a long housing 12, this can be resisted by partitioning the housing into an axially extending series of portions, either by cross-sectional partitions or by transversely extending baffles which partially close off the partitions from one another but do not prevent communication therebetween, e.g. central circular discs spaced by annular spaces from the housing 12 and alternating with peripheral baffles extending circumferentially along the housing and projecting radially inwardly.

As a particular example the Applicant proposes an apparatus for processing 25 tonnes a day of fine coal to produce synthesis gas at 5 bars [i.e. 0,5 MPa] gauge pressure would have the following dimensions:

diameter of housing 12 - 1,5 m
length of housing 12 - 2,0 m
spacing between partitions 16 - 0,5 m
depth of partitions 16 - 0,7 m The partitions would have their edges 20 spaced approximately 200 mm in a vertical direction from the housing 12.

For a coal having an approximate mass analysis of e.g. 53% fixed carbon; 22% volatile material; 21% ash; 4% water and a calorific value of 31 MJ/kg [more particularly about 60% by mass carbon; 3% hydrogen; 2% nitrogen; 0,2% sulphur; 10% oxygen; 21% ash; and 4% water], an air flow rate of about 49 $m^3$/min [at standard temperature and pressure] is proposed, with a steam flow rate of 12–13 kg/min, both the air and steam being preheated to about 350° C. Fine ash production rate would be 4 kg/min, two thirds emanating from the pipes 68 and one third issuing from the pipes 64.

Synthesis gas issuing from the pipes 68 would have a dry analysis of about 52–53% by volume hydrogen; 33% carbon monoxide; 10% carbon dioxide; 22% water and 4–5% nitrogen and hydrogen sulphide. Waste gas issuing from the pipes 64 would have a dry analysis of about 1% by volume hydrogen; 10% carbon monoxide; 15% carbon dioxide; 74% nitrogen; and 0–1% water. The synthesis gas production rate on a wet basis would be about 32–33 m$^3$/min at standard temperature and pressure, with a waste gas production rate of about 46–47 m$^3$/min at standard temperature and pressure.

In the draught zone a temperature increase from about 835° C. at the bottom up to about 920° C. at the top would occur; and in the housing 12 outside the draught zone a temperature decrease from about 920° C. at the top to about 835° C. at the bottom would occur. The solids inventory circulation rate through the draught zone would be about 1 tonne/min. It is believed that, outside the draught zone, the temperature profile will be substantially linear, and that in principle it is possible to operate with a maximum temperature as high as 900°–950° C. at the top, and a minimum temperature as low as 600° C. at the bottom of the circulating bed, although normal maximum and minimum temperatures will typically be somewhat less and greater respectively than these extremes.

I claim:

1. A circulating fluidized bed apparatus comprising:
a housing;
a pair of spaced partitions located within the interior of the housing, the partitions being opposed to each other and horizontally spaced from each other to define a draught zone therebetween, the partitions each extending upwardly from lower edges defining therebetween a lower inlet leading into said zone from the interior of the housing outside said zone, to upper edges defining therebetween an upper outlet leading from said zone into the interior of the housing outside said zone;
separate fluid feed arrangements respectively for feeding a fluidizing fluid into the housing for fluidizing a particulate material in the draught zone between the partitions and for feeding a fluidizing fluid into the housing for fluidizing a particulate material in the interior of the housing outside said draught zone, the feed arrangement for said draught zone being a central feed arrangement located under the draught zone and the feed arrangement for the interior of the housing outside said draught zone being an outer feed arrangement located on opposite sides of the central feed arrangement and below the interior of the housing outside the draught zone; and
above the draught zone, fluid outlet arrangements from the housing respectively for fluidizing fluid from the draught zone and fluidizing fluid from the interior of the housing outside said draught zone, namely a central fluid outlet arrangement for fluidizing fluid from the draught zone and an outer fluid outlet arrangement for fluidizing fluid from the interior of the housing outside the draught zone, the outer fluid outlet arrangement being located on opposite sides of the central fluid outlet arrangement.

2. An apparatus as claimed in claim 1, in which the partitions are in the form of a pair of panels each extending upwardly from a lower edge to an upper edge, the lower edges of the panels being at the same level as each other and spaced above the housing so that the space between the lower edges of the panels and the housing provides the lower inlet into the draught zone, and the upper edges of the panels being at the same level as each other and spaced below the housing so that the space between the upper edges of the panels and the housing provides the upper outlet from the draught zone.

3. An apparatus as claimed in claim 2, in which the partitions extend horizontally alongside each other in a direction transverse to the horizontal direction in which they are spaced from each other, the housing having an outline in vertical section along a vertical plane parallel to the direction in which the partitions are spaced from each other, which outline is bilaterally symmetrical about a vertical plane parallel to the partitions and located midway therebetween.

4. An apparatus as claimed in claim 3, in which the housing has a pair of horizontally spaced end walls, the partitions having end edges fast with the end walls, and said outline in vertical section of the housing being circular, so that the housing is in the form of a hollow cylindrical vessel having a horizontal axis.

5. Apparatus as claimed in claim 1, in which the central feed arrangement comprises a central array of stand pipes projecting upwardly into the interior of the housing and terminating at upper ends provided with fluid distribution nozzles, the outer feed arrangement comprising a pair of outer arrays of stand pipes on opposite sides of the central array, the stand pipes of the outer arrays projecting upwardly into the interior of the housing and terminating at upper ends provided with fluid distribution nozzles.

6. An apparatus as claimed in claim 5, in which the stand pipes of each array are arranged in rows, the stand pipes of each row being spaced in series from one another and the rows extending from one end of the housing to the other, the apparatus including a plurality of pressurizable plenum chambers extending alongside one another in a direction from one end of the housing to the other, the lower ends of the stand pipes of each row communicating with the same plenum chamber, the upper ends of all the pipes communicating with each plenum chamber being at the same elevation in the housing, and the upper ends of the laterally outermost stand pipes being at the highest elevation with the upper ends of the laterally innermost stand pipes being at the lowest elevation and said elevations increasing progressively from the innermost stand pipes to the outermost stand pipes.

7. An apparatus as claimed in claim 5, in which the upper end of each stand pipe is closed off, its fluid distribution nozzle comprising a horizontal row of peripherally spaced passages through its side wall adjacent the closed end of the pipe, the outer end of each passage being at an elevation no higher than the inner end thereof.

8. An apparatus as claimed in claim 1, in which the top of the draught zone is enclosed by a hood having a pair of downwardly depending skirts which have lower edges outwardly spaced respectively from the partitions and located below the level of the upper edges of the partitions.

9. An apparatus as claimed in claim 8, in which the skirts of the hood slope upwardly from their lower edges and oppositely outwardly from each other.

10. An apparatus as claimed in claim 1, in which the central fluid outlet arrangement comprises a plurality of outlet openings through the housing spaced in series from one another at a central position above the draught zone, the outer fluid outlet arrangement comprising two series of outlet openings through the housing above the interior of the housing on opposite sides of the draught zone.

11. An apparatus as claimed in claim 1, which has a particulate solid feed system comprising a plurality of downwardly extending ducts into the interior of the housing, the ducts having outlets into the interior of the housing outside the draught zone.

* * * * *

UNITED STATES PATENT AND TRADEMARK OFFICE
CERTIFICATE OF CORRECTION

PATENT NO. : 4,945,656

DATED : August 7, 1990

INVENTOR(S) : Michael Robin JUDD

It is certified that error appears in the above-identified patent and that said Letters Patent is hereby corrected as shown below:

Col. 8, line 19, "4 and 5" should read --3 and 4--.

Col. 9, line 11, after "48," insert --56--.

Col. 11, line 63, "7" should be --8--.

Col. 12, line 17, "plates 48,50" should be --chambers 52,54--.

Col. 12, line 17, "walls 56 and panels 58" should be --walls 82 and chambers 58,60--.

Signed and Sealed this

Ninth Day of November, 1993

*Attest:*

BRUCE LEHMAN

*Attesting Officer*   *Commissioner of Patents and Trademarks*